United States Patent

Janson

[15] 3,644,765
[45] Feb. 22, 1972

[54] COMMUTATORLESS DIRECT CURRENT MOTOR

[72] Inventor: Jan Janson, Emmasingel, Eindhoven, Netherlands

[73] Assignee: U.S. Philips Corporation, New York, N.Y.

[22] Filed: Mar. 20, 1970

[21] Appl. No.: 21,412

[30] Foreign Application Priority Data

Mar. 25, 1969 Netherlands..........................6904617

[52] U.S. Cl..............................................310/68, 318/254
[51] Int. Cl........................................................H02k 11/00
[58] Field of Search...............310/68, 68 B, 68 E, 49, DIG. 3, 310/49 A, 158, DIG. 6, 165, 177, 219; 318/138, 254

[56] References Cited

UNITED STATES PATENTS

| | | |
|---|---|---|
| 2,512,325 | 6/1950 | Hansen....................................310/68 |
| 2,536,805 | 1/1951 | Hansen....................................177/380 |
| 2,754,464 | 7/1956 | Wizenez...............................310/68 B |
| 2,818,518 | 12/1957 | Phaneuf................................310/177 |
| 2,885,645 | 5/1959 | Wennerberg.........................336/120 |
| 3,083,314 | 3/1963 | Ratajaski..............................310/219 |
| 3,486,099 | 12/1969 | Brunner...............................318/138 |
| 3,531,671 | 9/1970 | Hohne...................................310/68 |

Primary Examiner—J. D. Miller
Assistant Examiner—R. Skudy
Attorney—Frank R. Trifari

[57] ABSTRACT

Commutatorless direct current motor preferably for use in apparatus for the reproduction of music and having a magnetic rotor enclosed by stationary coils. Magnetic field sensitive electronic circuit elements to control the supply of electric current to the stationary coils are located near an axial boundary surface of the rotor between the rotor and diametrically projecting parts of the coils. A magnetic conducting plate supports the magnetic field sensitive element so as to concentrate the field.

3 Claims, 2 Drawing Figures

PATENTED FEB 22 1972 3,644,765

INVENTOR.
JAN JANSON
BY
AGENT

COMMUTATORLESS DIRECT CURRENT MOTOR

The invention relates to a commutatorless direct current motor, having a rotor which consists at least partially of permanent-magnetic material and is enclosed by stationary coils the windings of which extend in a substantially axial direction parallel to the rotor shaft and also in substantially diametrically projecting directions parallel to the axial boundary surfaces of the rotor. The motor has several magnetic field sensitive electronic circuit elements for selectively controlling the supply of electric current to the coils according to the angular position of the rotor.

Such a motor has been described in the paper "Elektronikmotor DMc 3, ein neuer kollektorloser Gleichstromkleinmotor" by D. von Werner and E. Rainer, Siemens Zeitschrift, Sept. 1966, No. 9, pages 690–693. The motor described in this paper has a support which consists of two half shells made of a synthetic resin, which encloses the permanent-magnetic cylindrical rotor and on which four coils are wound. At its axial ends the support has hub-shaped projections. At the connecting side of the motor a stator shield provided with connecting lugs has been secured on the hub-shaped projecting. Two parts of the stator shield in the form of segments of a cylinder extend axially beyond the axial boundary surface of the permanent-magnetic rotor and carry the magnetic field sensitive electronic circuit elements, in this case Hall elements. The Hall elements are disposed on pieces of thin sheet steel in order that part of the magnetic flux should be concentrated on them and they bear on the coils. The coils are surrounded by a laminated iron stator. The stator laminations have apertures at the points at which the Hall elements with their thin concentrating steel sheet plates are disposed on the coils.

A first disadvantage of the known motor is that two kinds of stator laminations are required, i.e., an unapertured kind and an apertured kind, which increases the cost of the motor. A second disadvantage consists in that owing to the apertures in the stator the motor will have "sticking positions" which in the operation of the motor will give rise to undesirable fluctuations in the output torque of the motor. Such fluctuations are particularly objectionable in those cases in which a drive of a highly uniform nature is required for example in apparatus for the reproduction of music. The phenomenon of the sticking positions increases with increase in the ratio between the length of a Hall element and the length of the rotor.

It is an object of the invention to provide a motor of the kind defined above in which the said disadvantages are eliminated or at least reduced. According to the invention each of the said magnetic field sensitive electronic circuit elements is disposed near an axial boundary surface of the rotor between the rotor and the diametrically projecting parts of the windings.

In this arrangement the field sensitive elements are not located in the radial main field of the rotor but in the stray field produced at the axial boundary surfaces. Hence apertures in the stator laminations can be dispensed with. It is true that the said stray field has a far smaller strength than the main field, but this is offset by the fact that the elements are disposed within the coils in the immediate proximity of the rotor. An additional advantage of the motor according to the invention is that by the disposition of the field sensitive elements at an axial surface of the rotor, the diameter of the motor can be reduced.

In an embodiment of the invention the said magnetic field sensitive electronic circuit elements are arranged between an axial boundary surface of the rotor and an annular iron plate for conducting the magnetic flux. This plate not only reinforces and concentrates the field at this area but it also ensures that the rotor has an axial preferred position. In practice, the motor is provided with a thrust bearing at the side of the said iron plate and the rotor shaft is drawn into engagement with the bearing pad in any position of the motor.

In an embodiment of the invention the said magnetic field sensitive electronic circuit elements are preferably disposed in recesses in, or on, a plate which is made of an insulating material and carries a printed circuit which is electrically connected to the said magnetic field sensitive electronic circuit elements and to central current conductors which extend beyond the coils.

The invention will now be described more fully with reference to the accompanying drawing in which.

Figure 1:
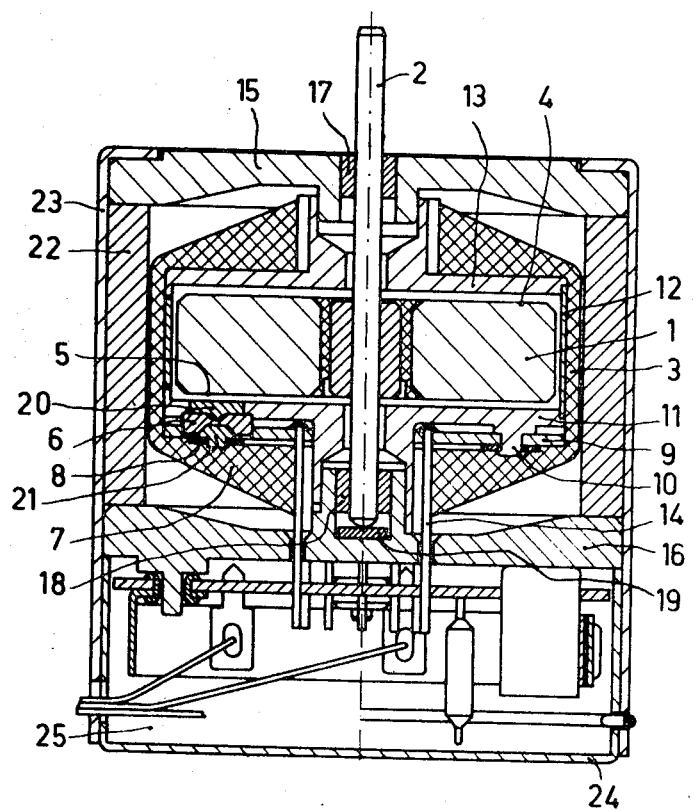
FIG. 1 is a longitudinal sectional view of an embodiment of an electric commutatorless direct current motor including Hall elements.
Figure 2:
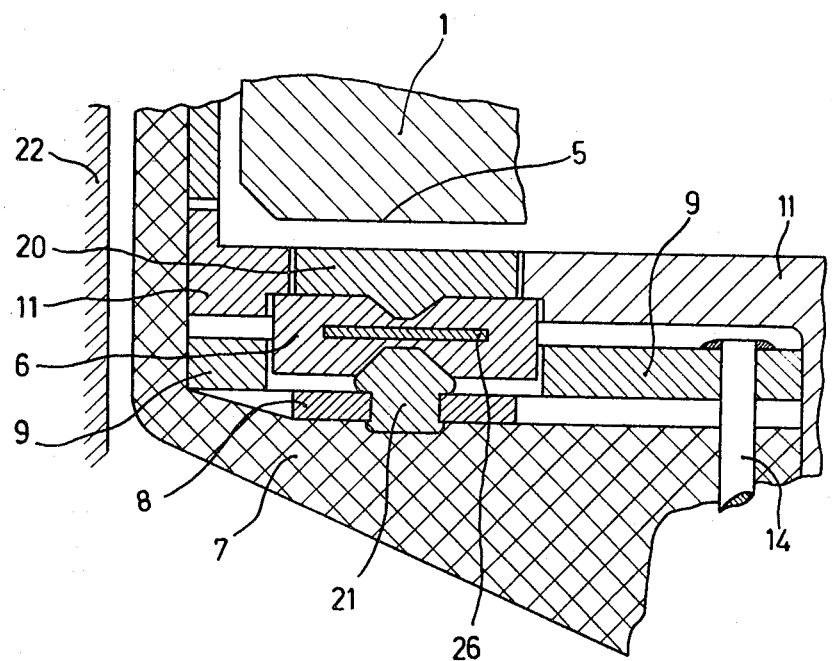
FIG. 2 is an enlarged view showing details of that area containing the Hall elements.

Referring now to the drawing, a diametrically magnetized permanent-magnetic cylindrical rotor 1 is secured to a rotor shaft 2. The rotor 1 is enclosed by the windings of stationary coils 3; the windings extend parallel to the rotor shaft 2 in a substantially axial direction and also parallel to the axial boundary surfaces 4 and 5 of the rotor in substantially diametrically projecting directions. A Hall element 6 plays a part in the selective supply of electric current to the coils according to the angular position of the rotor 1. For this purpose, the motor includes a second Hall element which is arranged at right angles to the element shown. The two Hall elements 6 are disposed near the axial boundary surface 5 of the rotor 1 between this rotor and substantially diametrically projecting parts 7 of the coils.

An annular iron plate 8 conducts the magnetic flux from one side of the rotor 1 to the other; the Hall element 6 is located between this plate and the rotor.

Reference numeral 9 designates a plate which is made of an insulating material and carries a printed circuit. The iron plate 8 and the plate 9 are together secured to a coil former built up of component parts 11, 12 and 13 by means of rivets 10 closed by a heat treatment. The support is also made of an insulating material.

The Hall elements 6 are accommodated in apertures in the plate 9 and electrically connected to the printed circuit on the plate 9. Current conductors in the form of metal studs 14 have been provided at the center and have also been electrically connected to the printed circuit. The studs 14 extend in the axial direction of the motor beyond the coils 3.

The rotor shaft 2 of the motor shown is journaled in sintered-bronze sleeve bearings 17 and 18 disposed in the two end shields 15 and 16 made of a synthetic material. At the side of the shield 16 the end of the shaft 2 bears on a bearing pad 19. The annular iron plate 8 attracts the rotor 1 with a force such in the direction towards the bearing pad 19 that the shaft 2 is urged to the pad in any position of the motor.

The motor shown has Hall elements 6 on the basis of silicon as components of an integrated circuit on the basis of silicon. In order to more or less concentrate the magnetic flux on the Hall elements pole pieces 20 and 21 have been cemented to the outer surface of the envelope of synthetic material. It is true that this introduces sticking positions again, but in the operation of the motor these give rise to torque variations which are many times smaller than those which occur in the known motor mentioned in the introductory part.

The drawing further shows a laminated stator 22, a casing 23 and a cover 24 both made of aluminum, and a space 25 between the cover 24 and the end shield 16. With the exception of the aforementioned integrated circuits all the electronic circuit elements required for controlling the motor are accommodated in this space.

What is claimed is:

1. A commutatorless direct current motor, comprising a rotor made at least partially of a magnetic material, stationary coils enclosing said rotor, said coils comprise a substantially cylindrical body the windings of which extend parallel to the rotor shaft in a substantially axial direction and parallel to the axial boundary surfaces of the rotor in substantially diametrically projecting directions, and magnetic field sensitive electronic circuit elements for selectively supplying electric current to the coils according to the angular position of the rotor, each of said elements being located within said cylindrical body and disposed near an axial boundary surface of the rotor between the rotor and the substantially diametrically projecting parts of the coils at the respective side of the rotor.

2. The motor as claimed in claim 1, wherein said magnetic field sensitive electronic circuit elements are disposed between an axial boundary surface of the rotor and an annular iron plate for conducting the magnetic flux.

3. A commutatorless direct current motor, comprising a rotor made at least partially of a magnetic material, stationary coils enclosing said rotor, the windings of said coils extending parallel to the rotor shaft in a substantially axial direction and parallel to the axial boundary surfaces of the rotor in substantially diametrically projecting directions, magnetic field sensitive electronic circuit elements for selectively supplying electric current to the coils according to the angular position of the rotor, each of said elements being disposed near an axial boundary surface of the rotor between the rotor and the substantially diametrically projecting parts of the coils at the respective side of the rotor and between said axial boundary surface of the rotor and an annular iron plate for conducting the magnetic flux, and a plate which is made of an insulating material and which carries a printed circuit which is electrically connected to the said magnetic field sensitive electronic circuit elements and to central current conductors which extend beyond the coils, said magnetic field sensitive electronic circuit elements being disposed in apertures on said plate.

* * * * *